April 4, 1967 P. G. LUCKHARDT 3,312,203
MOTIVE POWER SYSTEM

Filed June 7, 1965 2 Sheets-Sheet 1

INVENTOR
PHILIP G. LUCKHARDT
BY Edwin E. Greigg
ATTORNEY

April 4, 1967 P. G. LUCKHARDT 3,312,203
MOTIVE POWER SYSTEM
Filed June 7, 1965 2 Sheets-Sheet 2

INVENTOR
PHILIP G. LUCKHARDT
BY *Edwin E. Greigg*
ATTORNEY

United States Patent Office 3,312,203
Patented Apr. 4, 1967

3,312,203
MOTIVE POWER SYSTEM
Philip G. Luckhardt, 516 N. Scott's Lane,
West Chester, Pa. 19380
Filed June 7, 1965, Ser. No. 461,645
7 Claims. (Cl. 123—17)

This invention relates to a rotary internal combustion engine having continuous combustion to carry on a relatively smooth operation and a continually operating compressor to feed oxidizing material to said engine. This type of engine is adapted to use hydrocarbons of lower octane rating than is customarily used in conventional four-cycle engines.

In this invention a separate compressor operates to feed oxidizing material into the explosion chamber. This compressor may be operated from the same power shaft as the engine or may be operated by a means separate and distinct therefrom. In the compressor outlet and the oxidizing material inlet to the engine, there are various regulating devices. These devices regulate the pressure and composition of the material being passed into the engine combustion chamber.

Accordingly, it is an object of this invention to provide a combustion chamber wherein gases are constantly being burned and there is a steady torque exerted upon the engine output shaft due to the constant pressure within the explosion chamber and the continuous ignition of fuel and oxidizing material.

It is another object of the invention to provide a positive displacement rotary compressor linked to the rotor of the engine.

It is another object of the invention to provide a novel fuel supply system.

It is a further object of the invention to provide a novel vane and rotor structure within the engine and also within the compressor.

It is a still further object of the invention to show the use and structure of a novel pressure differential regulator.

Other objects and advantages will become apparent upon a further reading of the following detailed description taken in conjunction with the drawings, in which.

In the present invention a compressor and a rotary engine having continuous combustion replaces the conventional four-cycle engine. The compressor works in a mechanically similar way to the engine to provide gas under pressure to the explosion chamber. The gas and fuel provided by the compressor to the engine is provided at a slightly higher pressure to the explosion chamber than the pressure found in the explosion chamber. The oxidizing material and fuel are continuously exploded in the explosion chamber and a multiplication of volume and liberation of heat takes place so as to provide a constantly expanding volume in the explosion chamber. This expanding volume will cause vanes 2, 3 and 4 to continue in a counterclockwise direction. As these vanes 2, 3 and 4 continue in a counterclockwise direction in the combustion chamber, their movement will serve to relieve the ever-increasing volume of gas being generated in the combustion chamber. The edge of the vane remote from the roller will ride along the inside of the housing 8 with which it forms a snug fit. As each vane comes to the exhaust port 5, the gas which has been pushing the vane will exhaust through the exhaust port 5 and at the same time the succeeding vane will fall down into the combustion chamber and in it turn, will be carried through the cycle from compression to exhaust.

Figure 1:
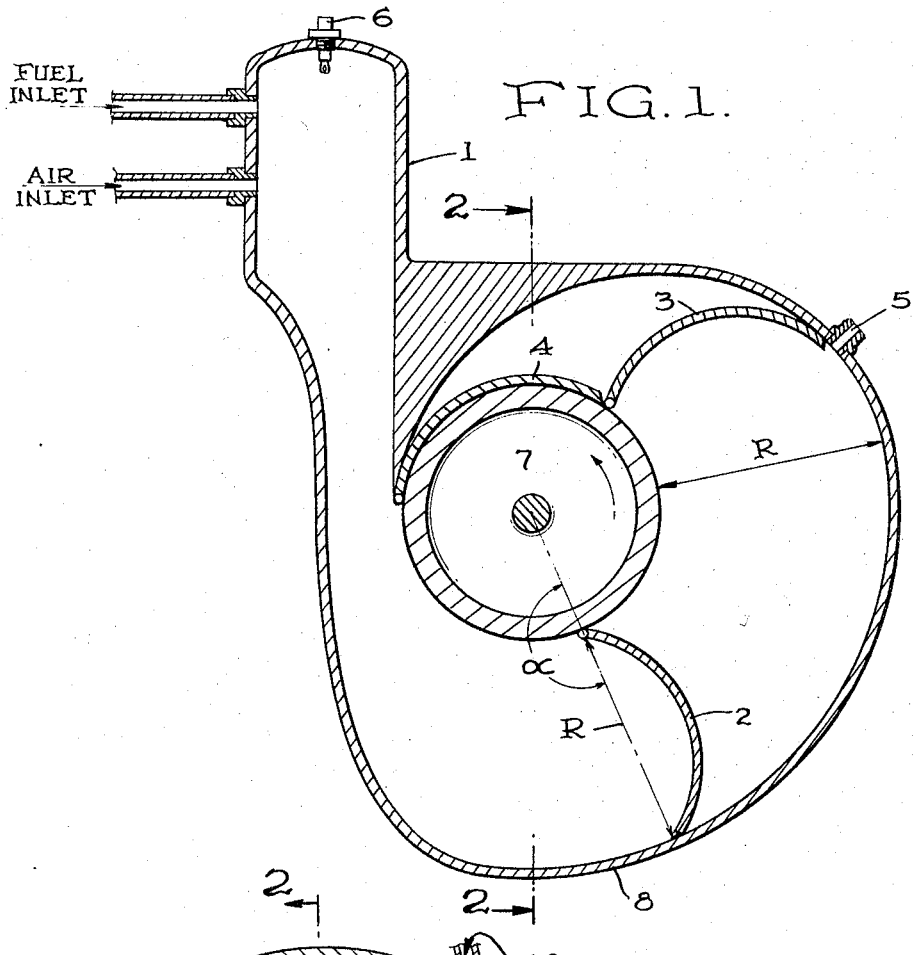
FIG. 1 is a vertical section showing the engine casing housing a rotor and explosion and expansion chambers.

The cycle for this rotor may be expressed as follows:

(1) Unfolding of vane from rotor
(2) Combustion
(3) Continual expansion
(4) Exhaust
(5) Folding of vane onto rotor The power phase is ⅓ of the full cycle. Thus, the full cycle in the engine is first, the vane unfolds, second, fuel and oxidizing material pass into combustion chamber 2 near the ignition element 6, ignition element 6 ignites this material which then explodes or burns, creating greater volume and heat. Third, the continuous creation of this volume causes pressure to be exerted upon curved vanes 2, 3 and 4, one at a time. These vanes are attached at one of their edges to rotary element 7. As shown in FIG. 1, the pressure of the continuously expanding gas will force vane 2 around until it reaches the position of vane 3. At that time, the gas in the area between vane 2 and the succeeding vane will start exhausting through outlet port or exhaust port 5. Thus, each vane will be working during one-third (⅓) of the cycle, folding back upon roller 7 for the next one-third (⅓) and completely folded onto the roller for the remaining one-third (⅓) cycle.

As the engine progresses through this cycle time after time, the shaft is turned and power is generated.

Figure 2A:
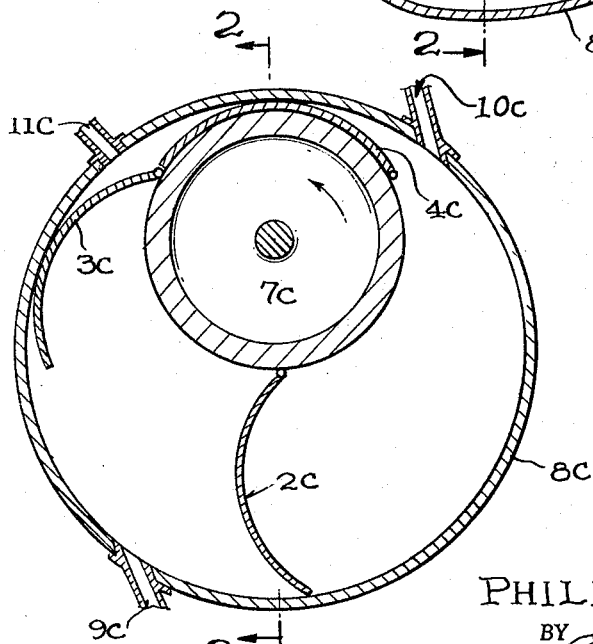
FIG. 2A is a vertical section showing the compressor casing housing the compression rotor and the inlet and outlet ports.
Figure 2:
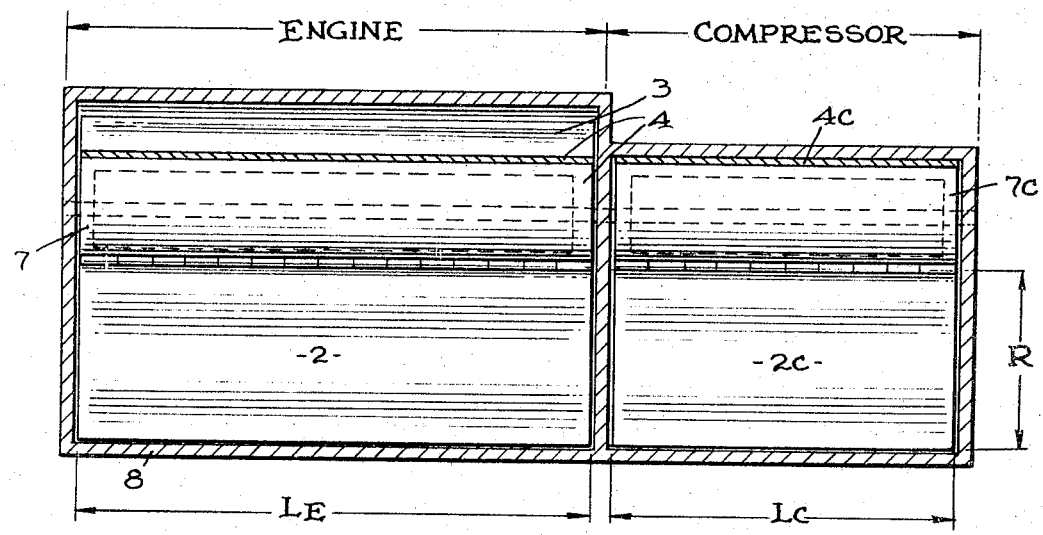
FIG. 2 is a cross-sectional view taken along the line 2—2 of FIG. 1 and showing the engine and the compressor co-axially aligned.

The compressor-engine in line combination shown in FIG. 2 is one of the options possible in this device. As shown here, the rotor of both the compressor and engine are mounted upon the same shaft and therefore rotate in unison. The oxidizing gas is compressed in the compressor on the right-hand side and this is fed into the rotor on the left-hand side. Due to the gas volume multiplication of chemical change and expansion with heat, the gases in the engine will occupy considerably more space than in the compressor. From a consideration of the vane areas involved in the compressor and engine, it is readily seen that only a small portion of the power developed by the engine is used in the compressor.

The compressor structure is seen most clearly in FIG. 2A of the drawings. The curved vanes are represented as 2C, 3C and 4C, to correspond to the vanes shown in the engine. The operation of the compressor vane structure is similar to that of the engine. Roller 7C turns, as shown in FIG. 2A, in a counterclockwise direction carrying with it vanes 2C, 3C, 4C which are attached at one end to hollow roller 7C, the other ends are free to slide against the smooth surface of the compressor housing 8C, and are long enough to be somewhat bent at all times. Taking the compressor through a complete cycle beginning with vane 2C, which has just passed the oxidizer inlet 9C, the tip of the vane 2C is sliding against the outer cylindrical housing surface and the vane is so perfectly matched with the outer housing cylindrical housing surface that no fluid can escape past it. Thus, as the roller continues to rotate in a counterclockwise direction, the air or other oxidizing medium which is in front of vane 7C is pushed out through outlet 10C. Vane 2C is continuously brought in closer to roller 7C as it advances toward the outlet. Finally, as it reaches the outlet or a point just past the outlet, vane 2C will be folded against roller 7C. At that time, it will have passed through the compression phase of its cycle. The next portion of its cycle will take it into a more open position where it will pass by low pressure or vacuum port 11C. As the vane sweeps from vacuum port 11C toward inlet port 9C, the vane sweeps out increasingly large areas and the gas behind the vane becomes rarified and of low pressure. By this means, gas will be drawn into port 11C and port 11C will become a low pressure or vacuum port.

In both the engine and compressor, force exerted on each vane is proportional to the pressure times the negative cosine of the angle alpha, i.e.

$$F = AP(-\cos \alpha)$$

$F$ = force in lbs.,
$\alpha$ = angle formed by radius of the rotor and cord of the vane cross-section,
$A$ = the area of the vane in square inches,
$P$ = pressure in lbs./square inch.

Figure 3:
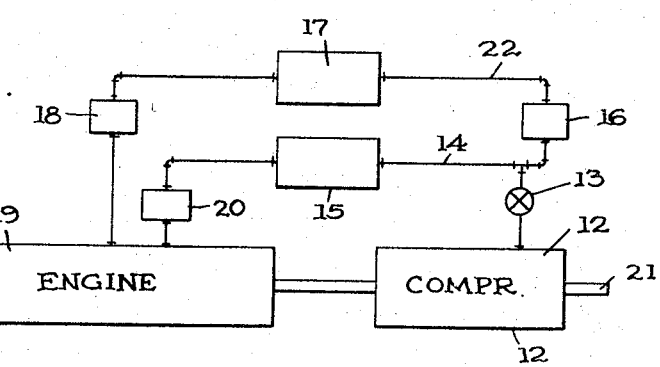
FIG. 3 is a schematic diagram showing in block form the elements of the apparatus so as to emphasize the functional relationship of the elements in the present invention and to show in conjunction with the specification the overall working of the apparatus.
Figure 4:
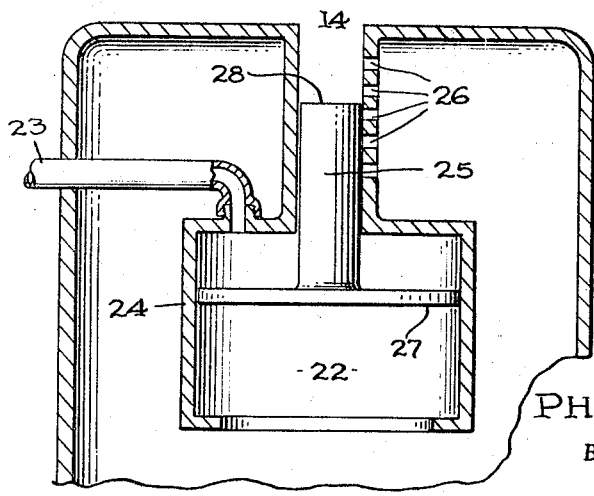
FIG. 4 is a cross-sectional view of a pressure differential regulator as used in the present invention.

In the overall view of the apparatus shown in FIG. 3, the pressure of the gas coming from the compressor 12 is regulated by means of a conventional pressure regulator 13 such as shown in Patent No. 2,082,223 and from there passes into line 14 which leads to fuel reservoir 15 and differential regulator 16. From differential regulator 16, the gas or oxidizing mixture passes into the reservoir 17, from reservoir 17 through valve 18 into the combustion chamber of the engine 19. In the other line, the gas passes into the fuel reservoir 15, there acting as a power source to cause the fuel to be injected through valve 20 into the combustion chamber. As an alternative possibility, the fuel and oxidizing mixture can be pre-mixed and injected as a single mixture into the engine combustion chamber. In this (FIG. 3) showing of the combination, the compressor and engine are shown as operated on a single shaft 21. Shaft 21, which extends through the engine rotor, compressor rotor, and out to the side is the torque shaft from which useful work may be obtained. It is within the scope of this invention that shaft 21 may be coupled to a compressor which will be used as a source of compressed air for a variety of uses and this source will also be tapped for feedback to the engine to provide an oxidization mixture into the engine.

The specific operation of the differential regulator 16 is shown best taken with FIG. 3. FIG. 3 shows a housing having three lines connecting to said housing. One line 14 is connected to the compressor through pressure regulator 16 and furnishes high pressure to the interior of the housing, a second line 22 is connected to the reservoir and engine and is the outlet for furnishing the regulated pressure to the regular reservoir and engine. The third line 23 is connected through the outer housing to an inner housing 24 and represents a vacuum line finally connected to low pressure vacuum port 11C of the compressor. The operation of the differential regulator is as follows: High pressure is introduced through the high pressure port and is brought into contact against the top of piston 25 at surface 28, located along the cylinder or sleeve means enclosing the upper part of the piston 25 are a series of holes 26 extending along substantially the length of the cylinder. As piston top 28 is moved downwardly, more holes are exposed and more of the high pressure air is allowed to escape into the low pressure zone outside of the sleeve. On the bottom of this piston 25 is an annular flange 27 which extends outwardly against expanded housing 24 so as to form an air-tight slidable fit. When pressure is fed in through the high pressure inlet, it passes into the small area above the piston head 28 pressing with a force equal to pressure × area of the head (in square inches) against the top of the piston head. At the same time, the low pressure in the low pressure zone is bearing against element 27 with a pressure or force equal to the low pressure × the area of element 27 in square inches. The piston 25 will seek a level such that the ratio of pressure above and pressure below will be inverse to the area of their respective base or piston tops.

This relationship is shown the mathematical formula $$\frac{A_L}{A_H} = \frac{P_H}{P_L}$$

where $A_L$ is equal to the area of the low pressure side,
$A_H$ is equal to the area of the high pressure side,
$P_H$ is equal to the pressure of the high pressure side,
$P_L$ is equal to the pressure of the low pressure side.

Only one embodiment of the invention has been depicted and described. It will be apparent that this embodiment is illustrative in nature and that a number of modifications in the apparatus and variations in its end use may be effected without departing from the spirit or scope of the invention as defined in the appended claims.

That which is claimed is:

1. An engine and compressor system having a rotary engine with an output shaft, a compressor driven by said shaft, a pressure conduit leading from said compressor to a valve, a first feed conduit from said valve to a differential regulator, a second feed conduit from said valve to a fuel reservoir, a fuel conduit extending from said fuel reservoir to the combustion chamber of said engine, and a conduit extending from said differential regulator to the combustion chamber of said engine.

2. An engine comprising a rotor having vanes pivotally attached to said rotor at one end, a housing having a rounded expansion chamber and having flat sides, and a combustion chamber at one end of said expansion chamber, fuel inlet and oxidizer inlet means to feed fuel and oxidizer into said combustion chamber, a rotor shaft passing through approximately the center of said rounded chamber, said rotor in said expansion chamber having its flat sides fitting snug with the flat sides of said expansion chamber and its vanes adapted to fit snugly against the rounded sides of said expansion chamber, said housing having an exhaust port located at the opposite end of said expansion chamber from said combustion chamber so that the combustion products may go out through said exhaust port when each vane bar passes through its expansion phase.

3. An engine comprising a housing in the general shape of a cylinder having flat sides, and having combustion chamber extending from a rounded side of said expansion chamber, said combustion chamber having a means for introducing fuel and oxidizing material into said combustion chamber, a rotatable shaft extending through the flat sides of said expansion chamber, a rotor mounted on said shaft and having flat sides which fit snugly against the sides of said expansion chamber, curved vanes attached at one end to the rounded sides of said rotor so as to form a fluid tight seal when the other ends of said vanes are in contact with the walls of said expansion chamber, said expansion chamber having a wedge extending from side to side along its curved wall adjacent said combustion chamber and extending into said expansion chamber to touch said rotor whereby said vanes are pushed back against said rotor just as they approach said combustion chamber and fall out against said expansion chamber wall to form a fluid tight seal when said rotor has turned and said housing having an exhaust port located near the end of said expansion housing and adjacent said wedge so that the combustion products will pass out through said exhaust port when the vane passes thereby.

4. A compressor having a housing shaped in the form of a short cylinder, a shaft mounted in said short cylinder, a roller mounted on a shaft and located next to one rounded side of said cylinder, curved vanes attached to said roller and of a size and shape to touch all sides of said cylinder in every position of said roller and lying flat against said roller when adjacent said housing, three ports in said cylinder, two of said ports being located one on each side of said roller and the remaining port being located in said housing opposite said roller.

5. A compressor having a housing shaped in the form of a short cylinder, a rotatable shaft mounted parallel to the long axis of said cylinder, a roller mounted on said shaft and touching the curved side of said cylinder, curved vanes having one edge attached to said roller and being of such size and shape as to touch the sides of the cylinder at all times and to lie snug on the roller when passing between said roller and said curved side of said cylinder, said housing having an outlet port being located on one side of said roller, a vacuum port being located on the other side of said roller and an oxidizer inlet port being located on the opposite side of said housing from said roller.

6. A differential pressure regulator comprising a housing having a tubular conduit extending into it, said conduit having a series of perforations along its side, an enlarged cylindrical section at the bottom of said conduit and sealingly attached to said conduit, a piston in said conduit and in enlarged cylindrical section, said piston having a round portion fitting snugly in said conduit and a short enlarged portion fitting snugly within said enlarged cylindrical section and a line connected from the exterior of said housing to the top of said enlarged cylindrical portion.

7. A differential pressure regulator comprising a sleeve having a series of perforations extending along its length, an enlarged portion attached to the end of said sleeve, a piston slidable in said sleeve and having a flange portion which fits snugly and slidably in said enlarged portion, a housing attached to the end of said sleeve remote from said enlarged portion and forming a chamber in which said sleeve and said enlarged portion are suspended, a line extending from outside said housing to the top of said enlarged portion, and said housing having a port communicating to the top of said sleeve and another port in its side.

References Cited by the Examiner
UNITED STATES PATENTS

| | | | |
|---|---|---|---|
| 1,010,388 | 11/1911 | Kirby | 230—154 |
| 1,270,546 | 6/1918 | O'Grady | 123—17 |
| 1,294,834 | 2/1919 | Rothweiler | 123—17 |
| 1,818,430 | 8/1931 | Ricardo | 230—154 |
| 2,605,715 | 8/1952 | Brant | 103—117 |
| 3,169,841 | 2/1965 | Weis | 230—137 |

DONLEY J. STOCKING, *Primary Examiner.*

W. J. GOODLIN, *Assistant Examiner.*